United States Patent
Okamura

(10) Patent No.: US 9,647,728 B2
(45) Date of Patent: May 9, 2017

(54) INFORMATION PROCESSING APPARATUS, METHOD FOR CONTROLLING THE SAME, AND NON-TRANSITORY COMPUTER-READABLE MEDIUM

(71) Applicant: CANON KABUSHIKI KAISHA, Tokyo (JP)

(72) Inventor: Shintaro Okamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 14/658,490

(22) Filed: Mar. 16, 2015

(65) Prior Publication Data

US 2015/0271712 A1 Sep. 24, 2015

(30) Foreign Application Priority Data

Mar. 24, 2014 (JP) ................. 2014-060797

(51) Int. Cl.
| | |
|---|---|
| *H04W 36/00* | (2009.01) |
| *H04B 5/00* | (2006.01) |
| *G06K 15/00* | (2006.01) |
| *G06F 3/12* | (2006.01) |
| *H04B 7/00* | (2006.01) |
| *H04W 36/14* | (2009.01) |

(52) U.S. Cl.
CPC ......... *H04B 5/0062* (2013.01); *H04B 5/0031* (2013.01); *H04W 36/14* (2013.01)

(58) Field of Classification Search
CPC ........ H04W 36/00; H04W 36/14; H04B 5/00; G06K 15/00; G06F 3/12; G03G 21/03
USPC ............. 340/10.51; 455/41.2, 436; 358/1.14, 358/1.15; 399/8, 366
See application file for complete search history.

(56) References Cited

U.S. PATENT DOCUMENTS

| | | | | |
|---|---|---|---|---|
| 7,965,401 B2 * | 6/2011 | Ishimaru | ................. | G06F 21/35 358/1.14 |
| 8,508,760 B2 * | 8/2013 | Sahashi | ................. | G06F 21/608 358/1.14 |
| 8,660,492 B2 * | 2/2014 | Hong | ................. | H04M 1/72561 455/41.2 |

(Continued)

FOREIGN PATENT DOCUMENTS

JP   A 2010-186387   8/2010

*Primary Examiner* — Nam V Nguyen
(74) *Attorney, Agent, or Firm* — Fitzpatrick, Cella, Harper & Scinto

(57) ABSTRACT

An information processing apparatus comprises: a write unit which writes information to a wireless communication tag; and a setting unit which sets, for the wireless communication tag, one of a plurality of interrupt settings that include at least a first interrupt setting that is for generating an interrupt signal when an external apparatus moves close to the wireless communication tag and a second interrupt setting that is for generating an interrupt signal when information is written to the wireless communication tag from an external apparatus, wherein if the write unit writes first information to the wireless communication tag, the setting unit sets the first interrupt setting for the wireless communication tag, and if the write unit writes second information to the wireless communication tag, the setting unit sets the second interrupt setting for the wireless communication tag.

11 Claims, 11 Drawing Sheets

(56) References Cited

U.S. PATENT DOCUMENTS

| | | | | |
|---|---|---|---|---|
| 8,805,279 B2* | 8/2014 | Choi | ................ | H04W 4/008 |
| | | | | 455/41.1 |
| 8,922,819 B2* | 12/2014 | Itogawa | ................ | G06F 3/1292 |
| | | | | 358/1.15 |
| 8,942,626 B2* | 1/2015 | Cho | ................ | H04W 76/023 |
| | | | | 370/331 |
| 8,953,201 B2* | 2/2015 | Kamiya | ................ | G06F 3/1204 |
| | | | | 358/1.13 |
| 8,964,232 B2* | 2/2015 | Itogawa | ................ | G06F 3/1236 |
| | | | | 358/1.1 |
| 8,982,401 B2* | 3/2015 | Itogawa | ................ | G06F 3/1292 |
| | | | | 358/1.14 |
| 9,013,728 B2* | 4/2015 | Adachi | ................ | G06F 3/1211 |
| | | | | 358/1.13 |
| 9,083,837 B2* | 7/2015 | Tredoux | ................ | H04B 5/0031 |
| 9,094,780 B2* | 7/2015 | Naruse | ................ | G06F 3/1204 |
| 9,235,364 B2* | 1/2016 | Park | ................ | G06F 3/1263 |
| 2014/0340701 A1 | 11/2014 | Okamura | ................ | G06F 3/121 |

* cited by examiner

F I G. 5A
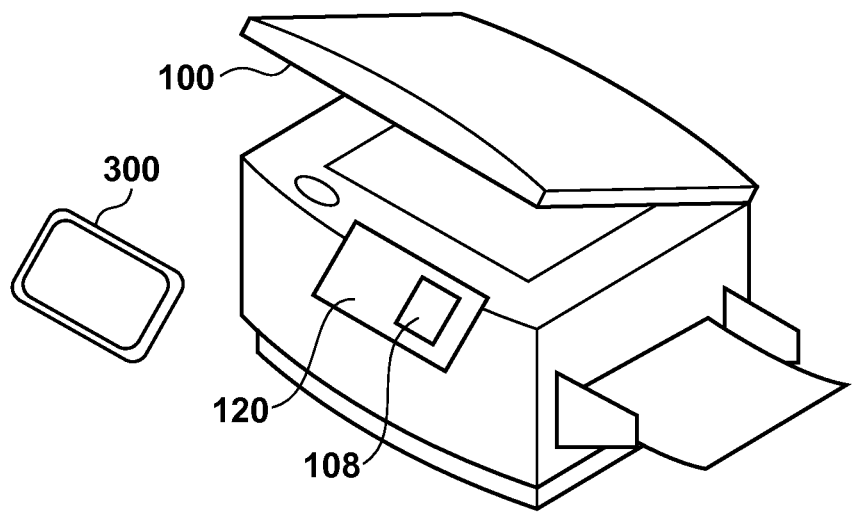
F I G. 5B
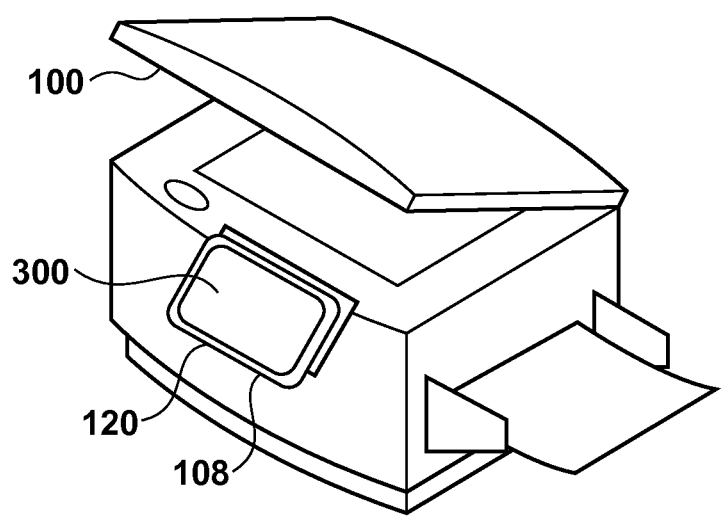

| No. | INTERRUPT SETTING | DESCRIPTION |
|---|---|---|
| 1 | NO INTERRUPTION | DO NOT GENERATE INTERRUPT SIGNALS |
| 2 | TOUCH | WHEN READER/WRITER MOVES CLOSE TO TAG |
| 3 | WRITE | WHEN READER/WRITER WRITES INFORMATION TO TAG |
| 4 | COMMAND | WHEN TAG RECEIVES INTERRUPT COMMAND FROM READER/WRITER |

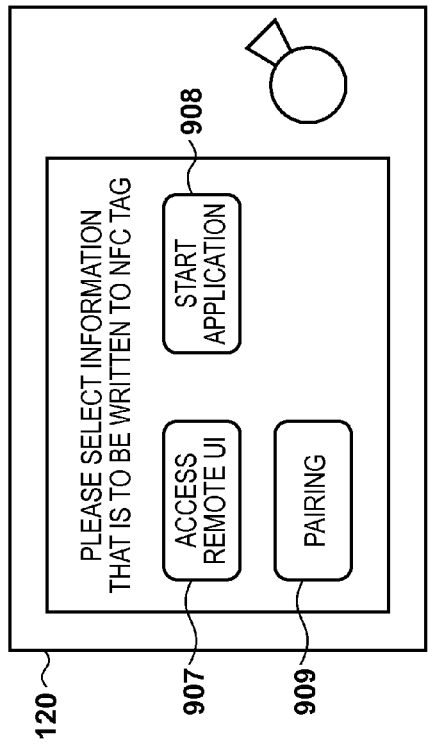
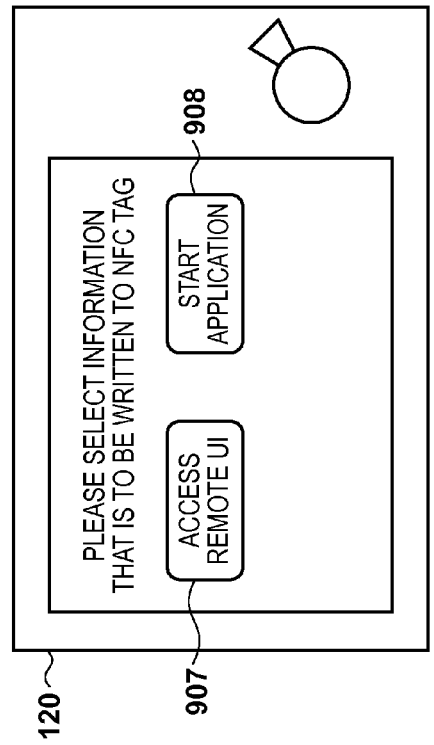
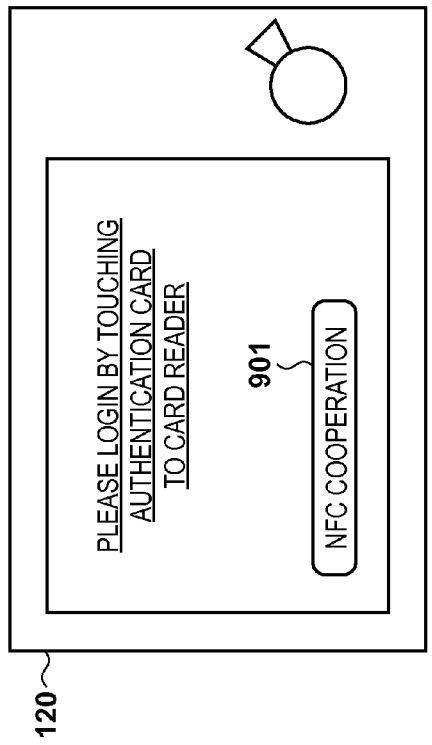
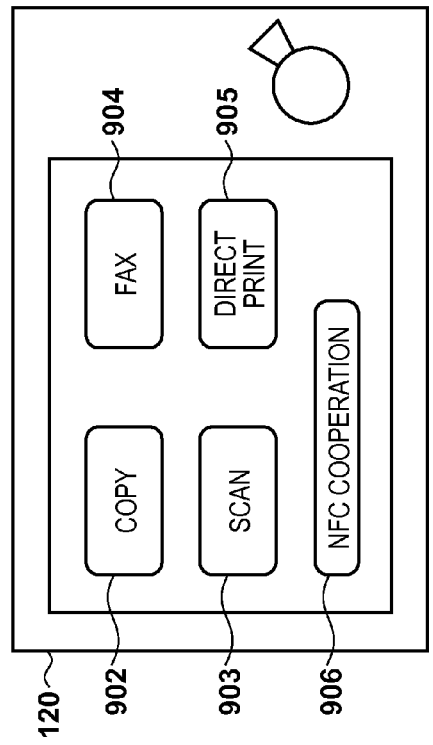

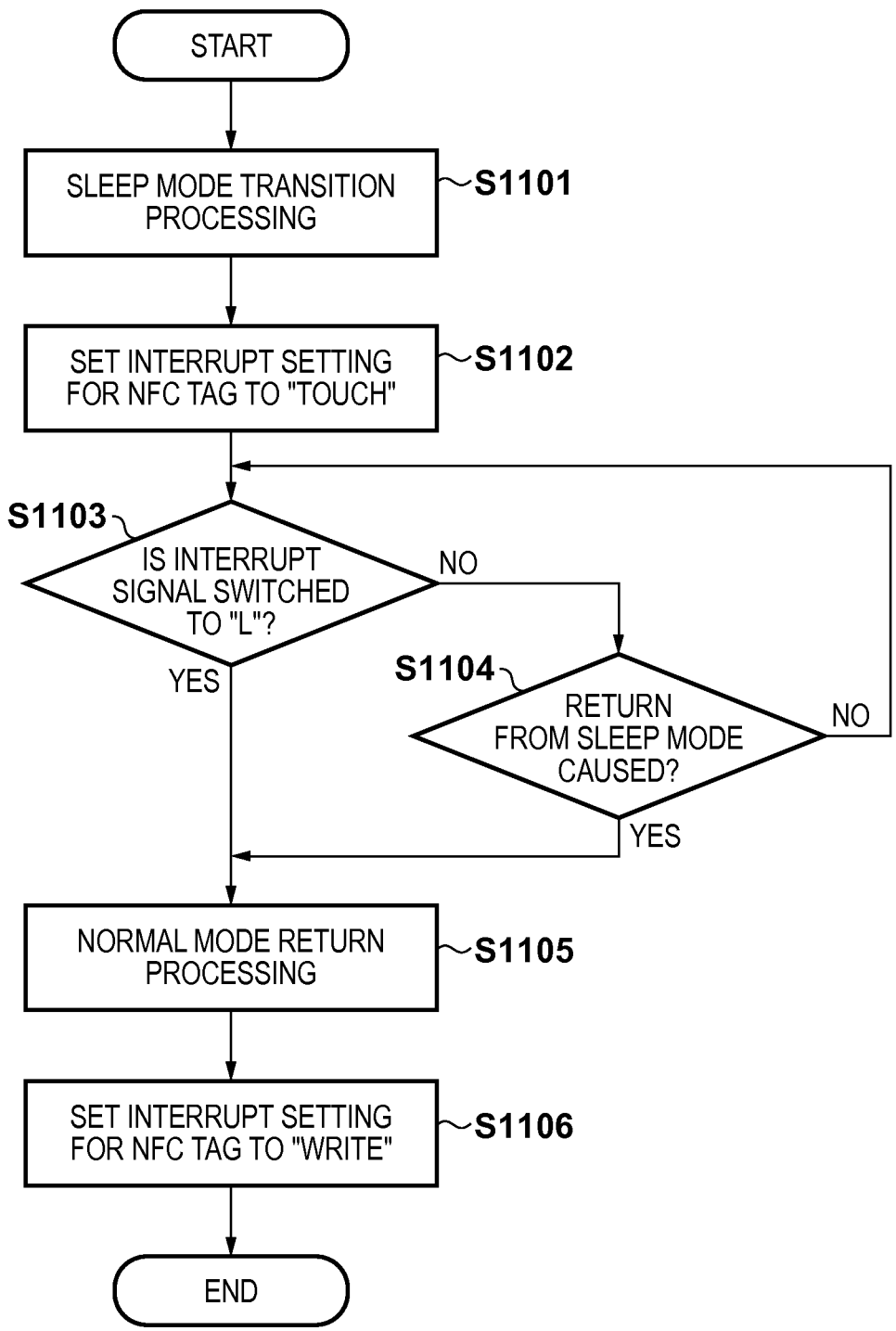

FIG. 12A

| MEMORY BLOCK | INFORMATION TO BE WRITTEN TO NFC TAG | INTERRUPT SETTING |
|---|---|---|
| 0 | ERROR INFORMATION | WRITE |
| 1 | REMOTE UI ACCESS INFORMATION | WRITE |
| 2 | APPLICATION START INFORMATION | WRITE |
| ⋮ | | |

FIG. 12B

| MEMORY BLOCK | INFORMATION TO BE WRITTEN TO NFC TAG | INTERRUPT SETTING |
|---|---|---|
| 0 | PAIRING INFORMATION | TOUCH |
| 1 | REMOTE UI ACCESS INFORMATION | WRITE |
| 2 | APPLICATION START INFORMATION | WRITE |
| ⋮ | | |

INFORMATION PROCESSING APPARATUS, METHOD FOR CONTROLLING THE SAME, AND NON-TRANSITORY COMPUTER-READABLE MEDIUM

BACKGROUND OF THE INVENTION

Field of the Invention

The present invention relates to an information processing apparatus, a method for controlling the same, and a non-transitory computer-readable medium. In particular, the present invention relates to a technique by which a function of an information processing apparatus is executed by device cooperation between the information processing apparatus and a mobile terminal that has a non-contact wireless communication function.

Description of the Related Art

Recently, a technique known as NFC (Near Field Communication), which is a non-contact wireless communication means, has rapidly come into wide use due to being loaded on mobile terminals such as smartphones and tablet PCs. Three functions are defined in the specification of NFC. The first function is a reader/writer function by which reading/writing of information from/to an RFID (Radio Frequency IDentification) tag or an NFC tag that has been conventionally used can be performed. The second function is a card emulation function by which operations that are equivalent to an NFC tag that can be read by a reader/writer serving as a communication partner can be performed. The third function is a peer-to-peer function by which various information can be transmitted and received via NFC. A mobile terminal on which the NFC function is loaded is equipped with a reader/writer, and information can be read from or written to an NFC tag by utilizing the reader/writer.

Also, recently, mobile terminals have included not only NFC but also various near field wireless communication means such as Wi-Fi (registered trademark), Bluetooth (registered trademark), and the like. Therefore, device cooperation according to which functions are utilized among electronic devices so as to find new values has been widely used. There is a technique known as "handover" in which when such near field wireless communication means are used, pairing or authentication between devices is performed using NFC, and the actual communication is handed over to Wi-Fi (registered trademark) or Bluetooth (registered trademark). With handover, the initial setting that is required to start near field wireless communication can be automatically performed by merely holding a reader/writer equipped device over an NFC tag to which information that is required for near field wireless communication such as Wi-Fi (registered trademark) or Bluetooth (registered trademark) has been written in advance. For example, in the case of Wi-Fi connection, an SSID (Service Set Identifier) and a security key of an access point are written in advance to an NFC tag of a device that is to be cooperated with.

However, there is known to be a technique in which in the case where information such as a security key has been written to the NFC tag, for example, when the tag cannot receive data storage signals transmitted from a reader/writer, the information in the NFC tag is deleted in the interest of improving security. (For example, see Japanese Patent Laid-Open No. 2010-186387)

However, in prior art, if the interval at which checking of whether or not an NFC tag has received a data storage signal is performed is set to a long interval, such as approximately several minutes, there is a possibility that the information in the NFC tag will not be deleted and will remain for a while after the NFC tag becomes unable to receive the data storage signal. Therefore, there is a possibility that another user will read the information before the information in the NFC tag is deleted, whereby the information will unintentionally leak out. Therefore, it is necessary to delete the information immediately after the information in the NFC tag has been read. In order to detect that the information in the NFC tag has been read, it is conceivable to use a method by which an interrupt signal generated by a tag IC is detected when the information is read. However, there are issues in that if interrupt signals are always generated by the tag IC when the information is read, interrupt processing is executed every time the information is read, and thus other devices that are included in the information processing apparatus are prevented from operating.

The present invention has been made in view of the above-described issues, and makes it possible to reliably delete information that has been written to an NFC tag after the information included in the NFC tag is read by a reader/writer and before the information is read by another user, without preventing other devices from operating.

SUMMARY OF THE INVENTION

According to one aspect of the present invention there is provided an information processing apparatus having a wireless communication tag, comprising: a write unit configured to write information to the wireless communication tag; and a setting unit configured to set, for the wireless communication tag, one of a plurality of interrupt settings that include at least a first interrupt setting that is for generating an interrupt signal in a case where an external apparatus moves close to the wireless communication tag and a second interrupt setting that is for generating an interrupt signal in a case where information is written to the wireless communication tag from an external apparatus, wherein in a case where the write unit writes first information to the wireless communication tag, the setting unit sets the first interrupt setting for the wireless communication tag, and in a case where the write unit writes second information to the wireless communication tag, the setting unit sets the second interrupt setting for the wireless communication tag.

According to another aspect of the present invention there is provided a method for controlling an information processing apparatus having a wireless communication tag, the method comprising: a write step of writing information to the wireless communication tag; and a setting step of setting, for the wireless communication tag, one of a plurality of interrupt settings that include at least a first interrupt setting that is for generating an interrupt signal in a case where an external apparatus moves close to the wireless communication tag and a second interrupt setting that is for generating an interrupt setting in a case where information is written to the wireless communication tag from an external apparatus, wherein in a case where first information is written to the wireless communication tag in the write step, the first interrupt setting is set for the wireless communication tag in the setting step, and in a case where second information is written to the wireless communication tag in the write step, the second interrupt setting is set for the wireless communication tag in the setting step.

According to another aspect of the present invention there is provided a non-transitory computer-readable medium that stores a program that causes a computer having a wireless communication tag to function as: a write unit configured to write information to the wireless communication tag; and a setting unit configured to set, for the wireless communication tag, one of a plurality of interrupt settings that include at least a first interrupt setting that is for generating an interrupt signal in a case where an external apparatus moves close to the wireless communication tag and a second interrupt setting that is for generating an interrupt setting in a case where information is written to the wireless communication tag from an external apparatus, wherein in a case where the write unit writes first information to the wireless communication tag, the setting unit sets the first interrupt setting for the wireless communication tag, and in a case where the write unit writes second information to the wireless communication tag, the setting unit sets the second interrupt setting for the wireless communication tag.

According to the present invention, security with respect to the handling of information included in an NFC tag is improved.

Further features of the present invention will become apparent from the following description of exemplary embodiments with reference to the attached drawings.

BRIEF DESCRIPTION OF THE DRAWINGS

FIGS. 5A and 5B are diagrams showing a state in which an image forming apparatus is away from a mobile terminal and a state in which the image forming apparatus is close to the mobile terminal.

FIGS. 9A, 9B, 9C, and 9D are diagrams showing examples of menus in which information is written to an NFC tag.

FIG. 11 is a flowchart indicating processing for an image forming apparatus according to a second embodiment to transition to a sleep mode and to return from the sleep mode.

FIGS. 12A and 12B are diagrams showing that a plurality of pieces of information are written to a storage region of an NFC tag.

DESCRIPTION OF THE EMBODIMENTS

Hereinafter, embodiments of the present invention will be described using the accompanying drawings. It should be noted that configurations indicated in the following embodiments are merely examples, and the present invention is not limited to the following configurations.

First Embodiment
System Configuration

Figure 1:
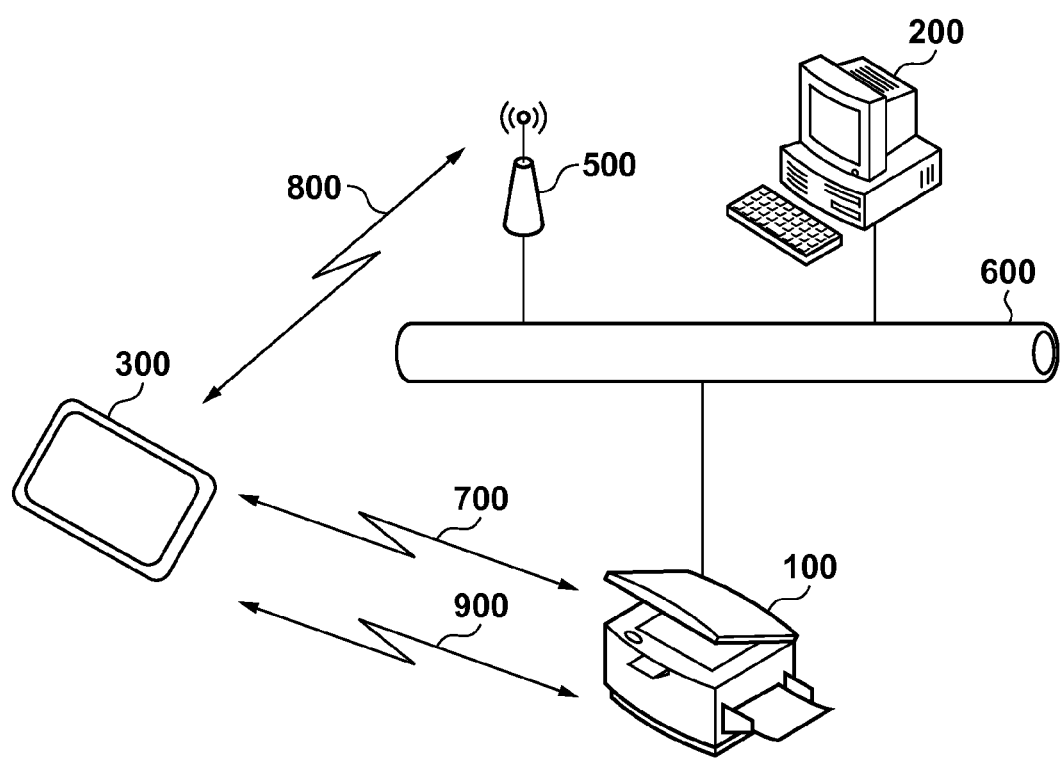
FIG. 1 is a diagram showing an overall configuration of a system.

A system configuration according to the present invention will be described. FIG. 1 shows an overall configuration of a system according to the present embodiment. This system includes an image forming apparatus 100, a personal computer (PC) 200, a mobile terminal 300, a wireless LAN access point 500, and a local area network (LAN) 600. The image forming apparatus 100 has a copy function, a print function, and a scan function. The PC 200 can transmit a print job to the image forming apparatus 100 and reference data electrically converted by the image forming apparatus 100. The mobile terminal 300 is a portable information processing terminal that includes wireless communication functions such as NFC communication 700, wireless LAN communications 800, 900, and the like, and corresponds to a smartphone, a tablet PC, or the like. The wireless LAN communication 800 is a method of communication for connecting the image forming apparatus 100 and the mobile terminal 300 via the wireless LAN access point 500. Also, the wireless LAN communication 900 is a method of communication for directly connecting the image forming apparatus 100 and the mobile terminal 300, such as Wi-Fi Direct.

The mobile terminal 300 can directly communicate with the image forming apparatus 100 via the NFC communication 700. Here, information that is to be transmitted and received includes an IP address, an SSID and a security key of the wireless LAN access point 500, error information, log information, information for starting applications that operate on the mobile terminal 300, and the like. Also, the mobile terminal 300 transmits image data in the mobile terminal 300 via the wireless LAN communications 800 and 900 to the image forming apparatus 100, and thereby can execute printing of the image data. The wireless LAN access point 500 has a function of allowing communication between the mobile terminal 300 and the like that has a wireless LAN interface and a device that is connected to the LAN 600. It should be noted that although a system configuration in which a wireless LAN is used is employed on the wireless communication interface of the present embodiment, other wireless communication techniques such as Bluetooth (registered trademark) or the like may be used. The LAN 600 is a network connection that is realized by Ethernet (registered trademark) or the like, and the image forming apparatus 100, the PC 200, and the wireless LAN access point 500 are connected to each other via the LAN 600.

Hardware Configuration
Image Forming Apparatus

Figure 2:
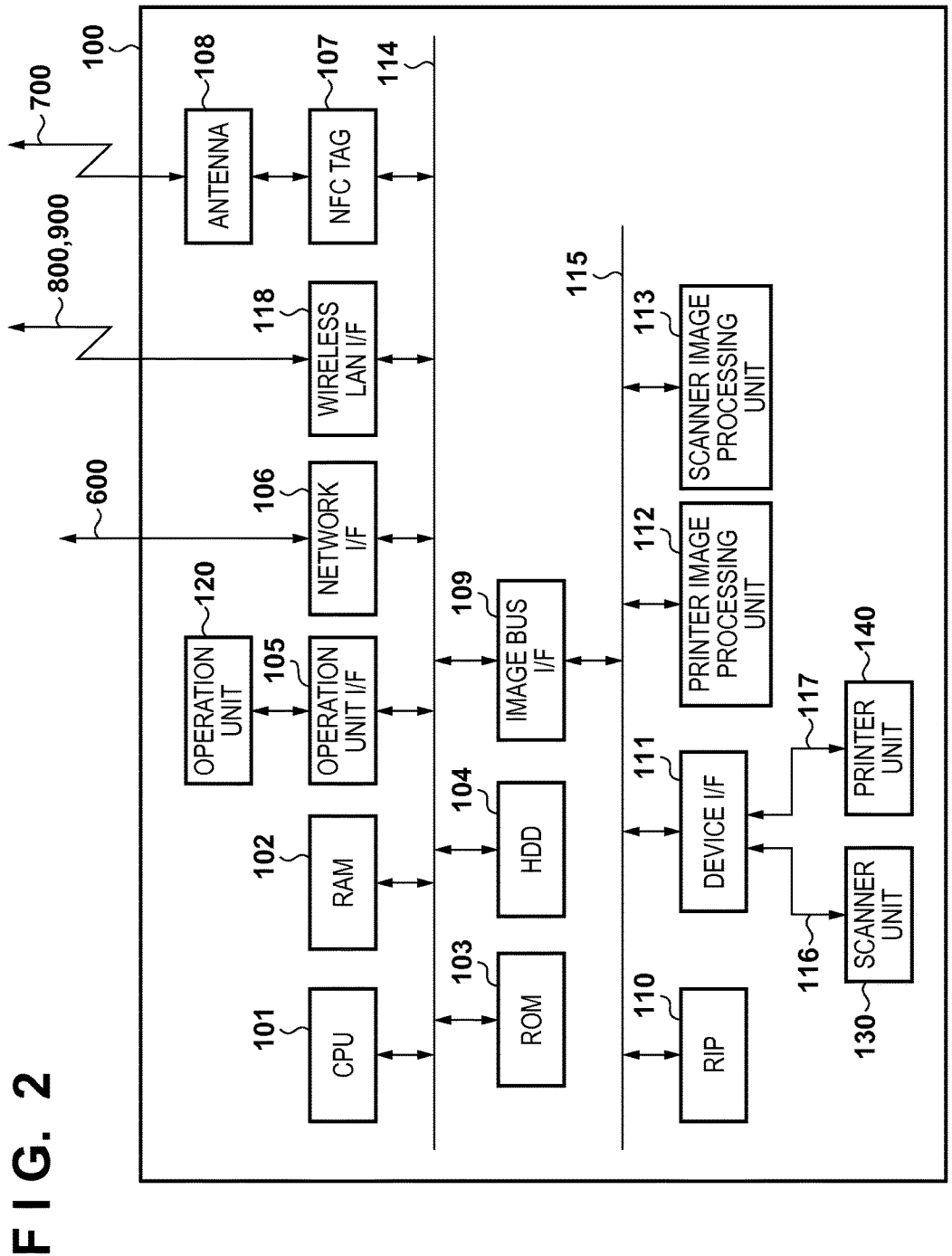
FIG. 2 is a block diagram showing the configuration of an image forming apparatus.

FIG. 2 is a block diagram showing the configuration of the image forming apparatus 100 of the present invention. A CPU 101 is a central processing unit that performs overall control of the image forming apparatus 100. A RAM 102 is a work memory for temporarily storing data that the CPU 101 uses in operations. A ROM 103 stores programs used to start up the image forming apparatus 100, and is mainly used when the image forming apparatus 100 is started. An HDD 104 is a hard disk drive that stores software and various settings that are related to control of the image forming apparatus 100, saved documents, and the like. An operation unit 120 is for performing input/output of information between the image forming apparatus 100 and a user, and is constituted by an LCD, a touch panel, and the like.

An operation unit I/F 105 is an interface for the operation unit 120, and relays data for which input to and output from the operation unit 120 is desired. A network I/F 106 is an interface for transmitting and receiving data with external devices via the LAN 600. A wireless LAN I/F 118 is an interface for transmitting and receiving data with external devices via the wireless LAN communications 800 and 900. An NFC tag 107 is a non-contact wireless communication tag and performs control for performing NFC communication. The configuration of the NFC tag 107 will be described in detail in FIG. 4. In the present invention, it is assumed that the NFC tag 107 is an NFC tag that can be controlled from the CPU 101, but the NFC tag 107 may be a non-contact wireless communication reader/writer that operates in a card emulation mode. The card emulation mode is a mode in which information from a communication partner performing wireless communication can be read/written. An antenna 108 is an antenna for performing NFC communication, and transmits and receives radio waves that are generated by NFC communication with an external device.

The CPU 101, the RAM 102, the ROM 103, the HDD 104, the operation unit I/F 105, the network I/F 106, the wireless LAN I/F 118, and the NFC tag 107 are connected via a system bus 114. An image bus I/F 109 acts as a relay between the system bus 114 and an image bus 115 that is connected to each block that performs image processing, and performs data conversion. The image bus 115 is connected to a RIP 110, a device I/F 111, a printer image processing unit 112, and a scanner image processing unit 113. The RIP 110 is a raster image processor, and converts page description language (PDL) codes or a display list into bitmap images. The device I/F 111 is an interface for connecting the image bus 115 to the scanner 130 and the printer unit 140. The device I/F 111 adjusts timing for transmitting image data that has been received from the scanner unit 130 to the image bus 115, and adjusts timing for transmitting image data from the image bus 115 to the printer unit 140. The scanner unit 130 performs processing such as correction, resolution conversion, or the like on image data generated by a scanner sensor (not shown) in accordance with the image forming apparatus 100. The printer unit 140 performs processing such as correction, resolution conversion, or the like on image data that is to be printed out, in accordance with a printer engine of the image forming apparatus 100.

Mobile Terminal

Figure 3:
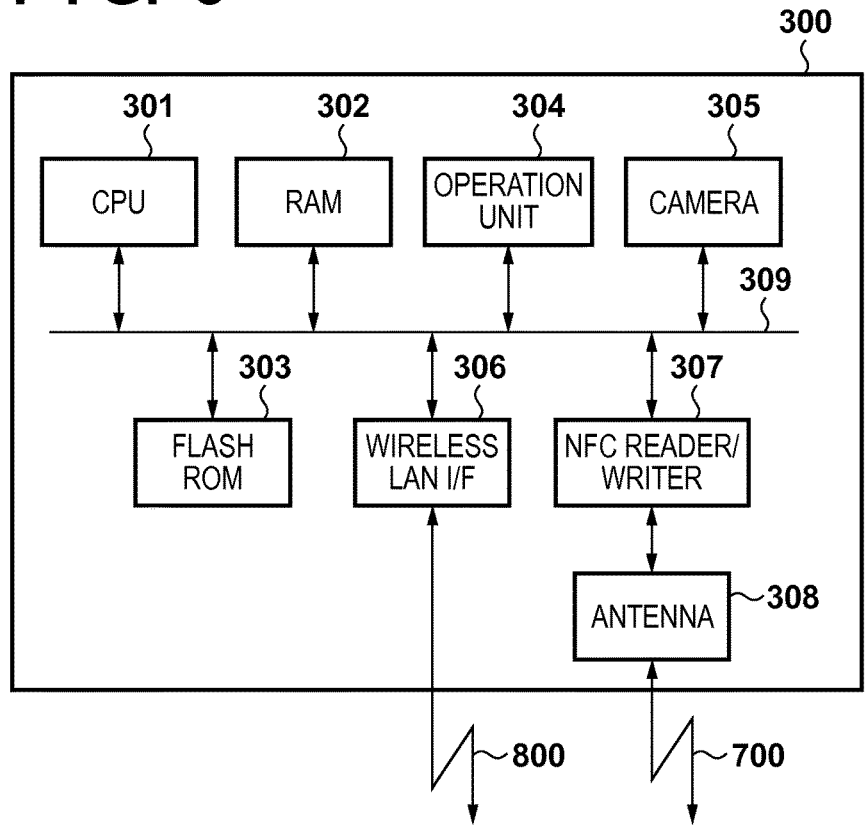
FIG. 3 is a block diagram showing the configuration of a mobile terminal.

FIG. 3 is a block diagram showing the configuration of the mobile terminal 300 of the present invention. A CPU 301 is a central processing unit that performs overall control of the mobile terminal 300. A RAM 302 is a work memory for temporarily storing data that the CPU 301 uses in operations. A flash ROM 303 stores programs and various data that the CPU 301 uses. An operation unit 304 is for inputting/outputting information between a user and the mobile terminal 300, and is constituted by an LCD and a touch panel. A camera 305 is an imaging unit that captures a still image and a moving image. A wireless LAN I/F 306 is an interface for transmitting and receiving data with an external device via the wireless LAN communication 800.

An NFC reader/writer 307 performs control for performing the NFC communication 700. An antenna 308 is an antenna for performing the NFC communication 700, and transmits and receives radio waves generated by the NFC communication 700 with an external device. The CPU 301, the RAM 302, the flash ROM 303, the operation unit 304, the camera 305, the wireless LAN I/F 306, and the NFC reader/writer 307 are connected via a system bus 309, and transmit and receive data with one another.

NFC Tag

Figure 4:
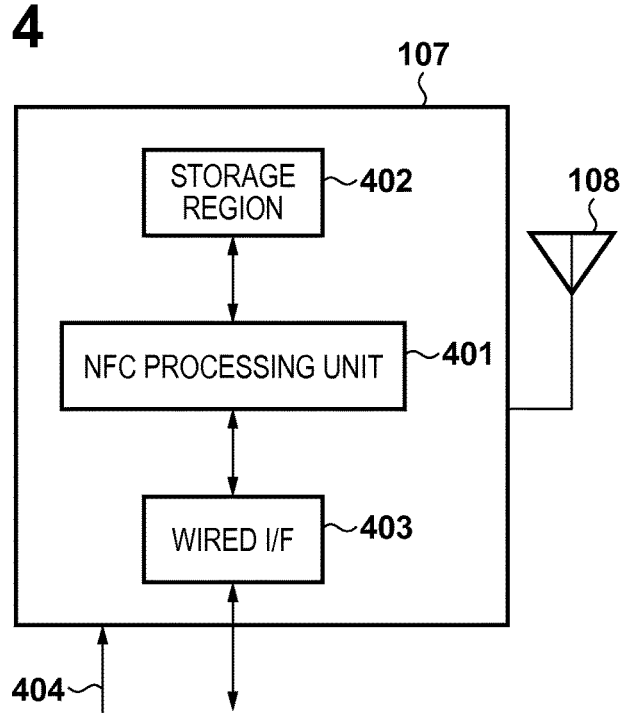
FIG. 4 is a block diagram showing the configuration of an NFC control unit.

FIG. 4 is a block diagram showing an example of the configuration of the NFC tag 107 according to the present embodiment. The NFC processing unit 401 is a communication processing unit that is related to NFC, is constituted by a CPU (not shown) and a RAM (not shown) that serves as a work memory of the CPU, and is connected to a non-volatile storage region 402 and a wired I/F 403. Due to the CPU 101 setting an interrupt setting register (not shown) in the storage region 402, the NFC processing unit 401 can generate interrupt signals at a timing that corresponds to interrupt settings. The interrupt settings will be described later using FIG. 7.

The storage region 402 stores information that can be read by an NFC reader/writer. The wired I/F 403 is an interface for executing writing/reading of information via the CPU 101 included in the image forming apparatus 100, and notifying interrupt signals generated by the NFC processing unit 401 to the CPU 101, and the wired I/F 403 is connected to the system bus 114. Also, the wired I/F 403 is connected to the storage region 402 via the NFC processing unit 401. The NFC tag 107 can operate using power supplied by radio waves received by the antenna 108, when performing non-contact wireless communication with an external reader/writer. Also, data in the storage region 402 can be accessed by a wired power supply 404 in addition to the power supplied from the antenna 108.

FIGS. 5A and 5B are diagrams showing a state in which the image forming apparatus 100 is away from the mobile terminal 300, and a state in which the image forming apparatus 100 is close to the mobile terminal 300. FIG. 5A shows the state in which the image forming apparatus 100 is away from the mobile terminal 300. The NFC reader/writer 307 that is included in the mobile terminal 300 is outside of a region where non-contact wireless communication with the NFC tag 107 included in the image forming apparatus 100 can be performed. In this state, the mobile terminal 300 cannot perform reading of/writing on information stored in the storage region 402 of the NFC tag 107.

FIG. 5B shows a state in which the image forming apparatus 100 is close to the mobile terminal 300. The NFC reader/writer 307 included in the mobile terminal 300 is in a region where non-contact wireless communication with the NFC tag 107 included in the image forming apparatus 100 can be performed. In this state, the mobile terminal 300 can perform reading of/writing on information stored in the storage region 402 of the NFC tag 107. At this time, information in the image forming apparatus 100 that can be read by the mobile terminal 300 includes information for starting applications that operate on the mobile terminal 300, and pairing information for handing over to communication using Wi-Fi (registered trademark), Bluetooth (registered trademark), or the like. Here, the pairing information corresponds to an SSID and a security key of an access point, an IP address, and the like, for example. The above-described applications can transmit image data in the mobile terminal 300 to the image forming apparatus 100 via the wireless LAN communication 800 by performing pairing between the mobile terminal 300 and the image forming apparatus 100, and can execute printing of image data. Also, in this state, the NFC tag 107 can receive and utilize radio waves generated by the NFC reader/writer 307 as operating power for itself.

Processing

Wireless Communication Establish Sequence

Figures 6, 7:
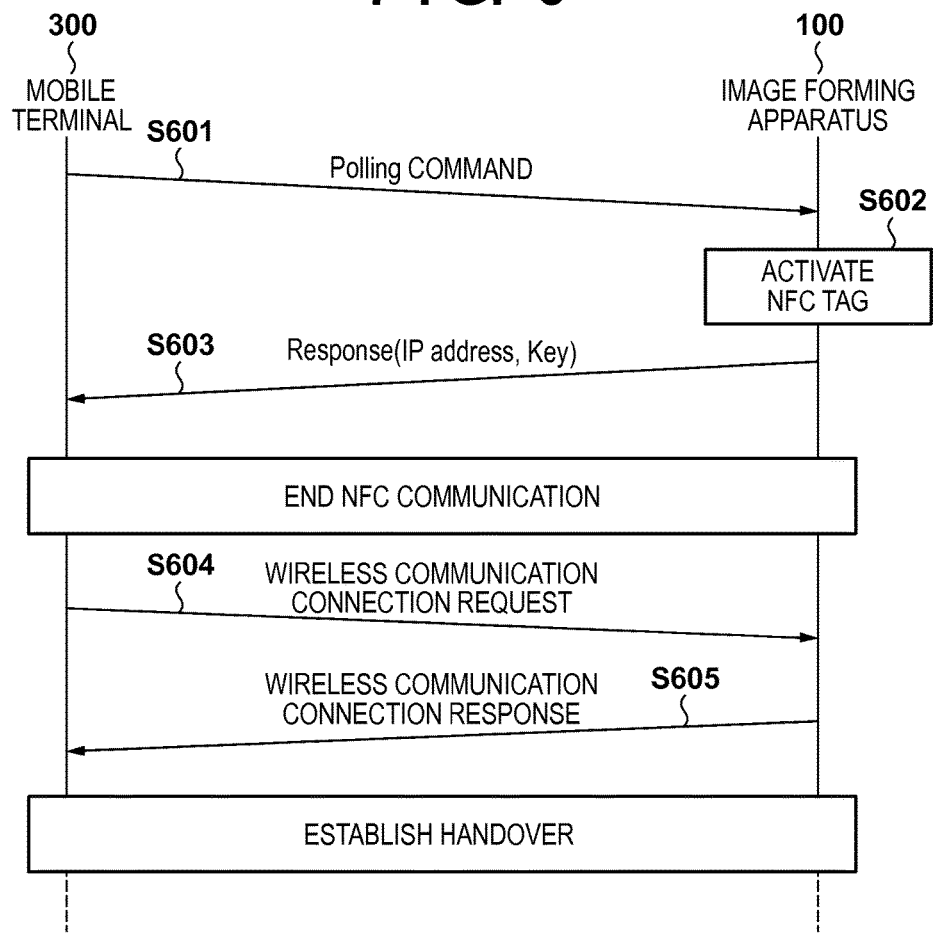
FIG. 6 is a flowchart indicating processing in which handover is performed using NFC.
FIG. 7 is a diagram showing the interrupt setting for an NFC tag.

FIG. 6 is a flowchart indicating a sequential control procedure for performing non-contact wireless communication and establishing wireless communication in the present embodiment. Here, communication using NFC is described as an example of non-contact wireless communication through all embodiments described later. Here, a sequential control procedure for processing in which the wireless LAN communications 800 and 900 are switched by handover after non-contact wireless communication has been established between the NFC tag 107 of the image forming apparatus 100 and the NFC reader/writer 307 of the mobile terminal 300 will be described. Also, a static handover method is used, according to which setting information stored in advance in the storage region 402 of the NFC tag 107 is read out by the mobile terminal 300 so as to connect the mobile terminal 300 to the image forming apparatus 100.

NFC is a non-contact wireless communication standard in which 13.56 MHz electromagnetic waves are used, and NFC makes it possible to perform bidirectional communication between devices while maintaining mutual connection with an existing non-contact IC card. First, connection is started when a user moves the mobile terminal 300 close to the NFC tag 107 of the image forming apparatus 100. In step S601, the NFC reader/writer 307 of the mobile terminal 300 transmits a polling command to the NFC tag 107 of the image forming apparatus 100. In step S602, because the NFC tag 107 of the image forming apparatus 100 cannot actively output radio waves, the NFC tag 107 is activated by the radio waves generated by the mobile terminal 300.

In step S603, the image forming apparatus 100 fluctuates the load inside the NFC tag 107 and transmits Response data to the mobile terminal 300. At this time, an IP address and a security key in the storage region 402 of the NFC tag 107 that are to be used in handover are transmitted to the mobile terminal 300. The above processing completes obtaining of an IP address for the mobile terminal 300 accessing the image forming apparatus 100 using the NFC communication. Up to here, the basic flow of NFC connection has been described. After obtaining the IP address and the security key of the image forming apparatus 100, the mobile terminal 300 temporarily stores them in the RAM 302 or the like.

Next, the mobile terminal 300 performs connection for communication using the wireless LAN communication 800 via the wireless LAN I/F 306. In step S604, the mobile terminal 300 uses the IP address and the security key stored in the RAM 302 to issue a wireless communication connection request to the image forming apparatus 100 via the wireless LAN I/F 306. In step S605, the image forming apparatus 100 detects a connection request from the mobile terminal 300 via the wireless LAN I/F 118, and performs authentication processing. Up to here, a procedure for controlling handover processing using NFC communication has been described. It should be noted that although this handover processing is performed via a touch operation (FIG. 5B) for convenience, if a user knows an IP address and a security key, he/she can operate the mobile terminal 300 and manually set the handover processing.

FIG. 7 is a diagram illustrating setting of timings at which the NFC tag 107 generates interrupt signals for the CPU 101. In other words, FIG. 7 shows settings for specifying what causes the NFC tag 107 to generate interrupt signals for the CPU 101 of the image forming apparatus 100. The CPU 101 of the image forming apparatus 100 can change how interrupt signals are generated (the frequency of generating interrupt signals) by setting a setting register (not shown) in the storage region 402 of the NFC tag 107 via the system bus 114. Hereinafter, each setting will be described.

No. 1 "no interruption" is a setting in which interrupt signals are not generated for the CPU 101 by the NFC 107 in any case. Thus, even if some type of communication occurs between the NFC tag 107 and the NFC reader/writer 307, the CPU 101 cannot sense the communication. No. 2 "touch" is a setting in which the NFC tag 107 senses the received radio waves and generates interrupt signals when the NFC reader/writer 307 moves close to the NFC tag 107. Here, it is assumed that in the setting of No. 2, interrupt signals are continuously generated from when the NFC reader/writer 307 moves close to the NFC tag 107 until when communication between the NFC reader/writer 307 and the NFC tag 107 is complete.

No. 3 "write" is a setting in which interrupt signals are generated when the NFC tag 107 receives a write command from the NFC reader/writer 307 and information is written thereto. It is assumed that in the case where this setting is performed, even if information in the storage region 402 of the NFC tag 107 is read by the NFC reader/writer 307, the NFC tag 107 does not generate interrupt signals. No. 4 "command" is a setting in which the NFC tag 107 generates interrupt signals upon receiving an interrupt generation command from the NFC reader/writer 307. It is assumed that interrupt signals are "H" level when interruption does not occur, and the interrupt signals are "L" level when interruption occurs. It should be noted that although four types of interrupt settings have been described as examples, the types of the interrupt settings are not limited to these because different settings can be performed depending on the type of device of the NFC tag 107.

Basic Processing Flow

Figure 8:
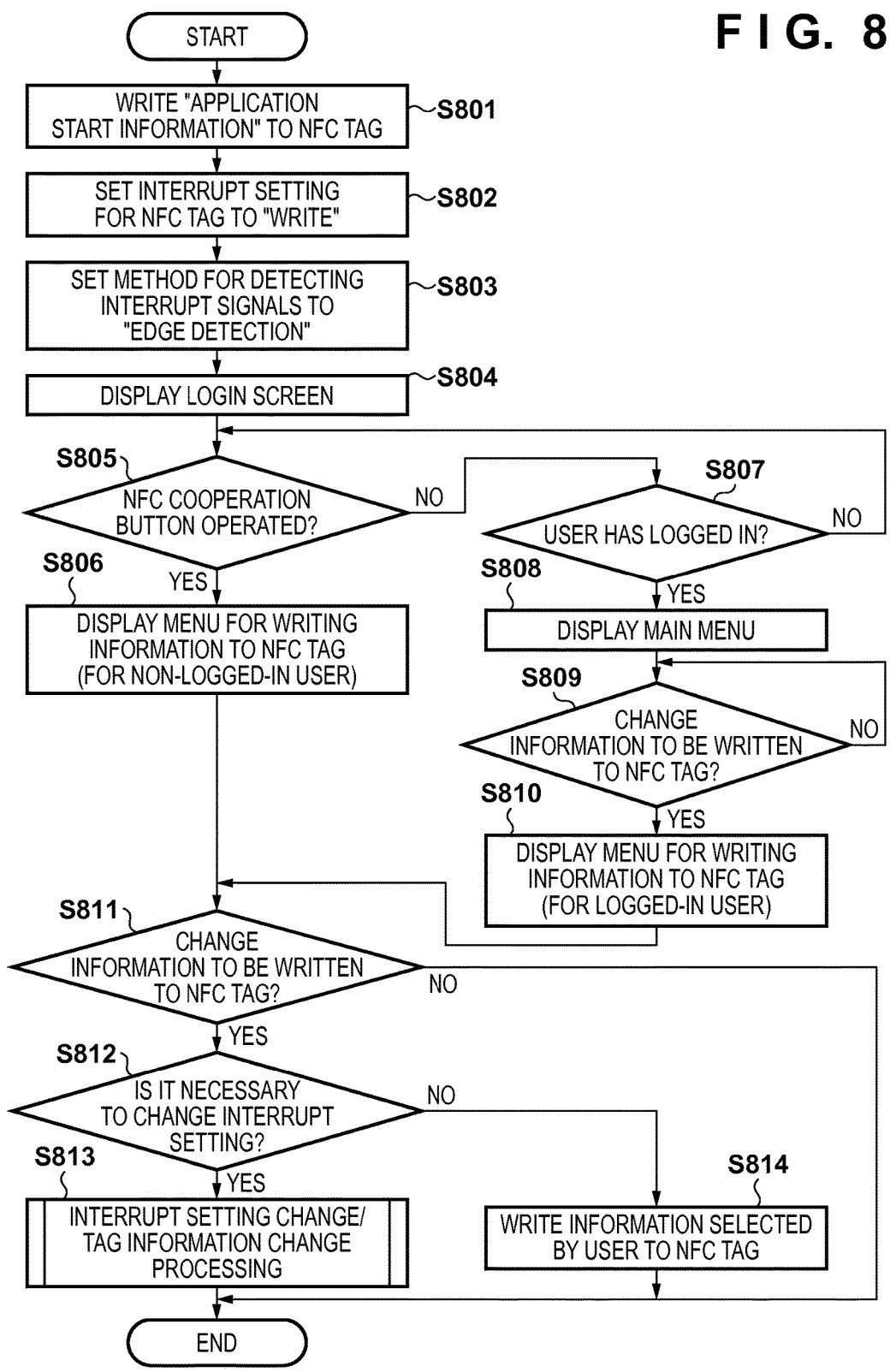
FIG. 8 is a flowchart indicating processing in which an image forming apparatus writes information to an NFC tag in a first embodiment.

Operations of the image forming apparatus 100 according to the first embodiment will be described using FIGS. 8, and 9A to 9D. FIG. 8 shows a basic processing flow according to the first embodiment. Also, FIGS. 9A to 9D are examples of screens that are displayed on the operation unit 120 in the basic processing flow of FIG. 8. The processing flow illustrated in FIG. 8 is realized by the CPU 101 of the image forming apparatus 100 executing programs stored in the ROM 103.

When a user turns on the power of the image forming apparatus 100, in step S801, the CPU 101 writes "application start information" to the storage region 402 of the NFC tag 107. The "application start information" is information that is read by the NFC reader/writer 307 so as to start a specific application that operates on the mobile terminal 300 side. Also, "application start information" will be described as an example of initial information that is to be written in the storage region 402 of the NFC tag 107 when the power of the image forming apparatus 100 is ON in the present embodiment. However, information that is to be written when the power is ON is not limited to this, and may be other information. Other information corresponds to pairing information, remote UI access information, application download information, and the like. The pairing information indicates an IP address, an encryption key, and the like that are required to perform pairing between the image forming apparatus 100 and the mobile terminal 300 as described above. Also, the remote UI access information indicates an IP address, and the like that are for accessing a remote UI function that allows an operation state of the image forming apparatus 100, information on expendable supplies and material such as toner and a remaining sheet amount, and the like to be referenced by the PC 200 or the mobile terminal 300. Also, the application download information is information regarding a URL (Uniform Resource Locator) from which a specific application that operates on the mobile terminal 300 can be downloaded.

In step S802, the CPU 101 sets the interrupt setting for the NFC tag 107 to "write". Further, in step S803, the CPU 101 sets a method for detecting interrupt signals generated by the NFC tag 107 to "Edge detection". At this time, the NFC tag 107 is set so as to generate interrupt signals and notify the CPU 101 via the system bus 114 in the case where the NFC reader/writer 307 has performed writing on the NFC tag 107. It should be noted that it is assumed that the CPU 101 is capable of detecting changes in interrupt signals (for example, a change from "H" to "L").

In step S804, the CPU 101 causes the operation unit 120 to display a login screen. FIG. 9A shows an example of display of a login screen. When an NFC cooperation button 901 is operated in the login screen that is displayed in step S804 (Yes in step S805), in step S806, the CPU 101 displays a menu in which information is written to the NFC tag 107 for a non-logged-in user. This menu screen will be described later using FIG. 9D.

On the other hand, in the case where user login has been confirmed (No in step S805 and Yes in step S807), in step S808, the CPU 101 displays a main menu for using various functions of the image forming apparatus 100, such as a copy function, a fax function, and the like. Herein, login is performed using a card reader (not shown) that is included in the image forming apparatus 100 and an authentication card (not shown) that a user possesses. Alternatively, a user may perform login by inputting a login ID and a password via the operation unit 120 of the image forming apparatus 100.

FIG. 9B shows an example of a main menu displayed in step S808. A copy button 902, a scan button 903, a fax button 904, and a direct print button 905 are buttons for respectively executing various functions in the image forming apparatus 100. The various functions indicate functions such as a copy function, a scan function, a fax transmission function, and a direct print function for directly performing printing of data in storage media such as a USB memory (not shown) and the like. The NFC cooperation button 906 is a button for displaying a menu for writing information to the NFC tag for a logged-in user. This menu screen will be described later using FIG. 9C.

When the NFC cooperation button 906 is operated in the main menu screen displayed in step S808 (Yes in step S809), in step S810, the CPU 101 causes the operation unit 120 to display a menu for writing information to the NFC tag 107 for a logged-in user. The reason why menus are displayed separately in accordance with the login states of an operating user in the present embodiment is because it is desired that information regarding a security key for pairing information with the image forming apparatus 100 and the like is disclosed only to logged-in users instead of being disclosed to anyone.

FIGS. 9C and 9D show examples of displaying a menu for writing information to the NFC tag 107. FIG. 9C is an example of displaying a menu for writing information to the NFC tag 107 for a logged-in user. FIG. 9D is an example of displaying a menu for writing information to the NFC tag 107 for a non-logged-in user. In FIG. 9C, a pairing information button 909 for the image forming apparatus 100 and the mobile terminal 300 can be selected for a logged-in user. On the other hand, in FIG. 9D, the pairing information button 909 is not displayed, so that the pairing information cannot be written. A user operates a menu displayed on the operation unit 120 using a touch panel included in the operation unit 120, and thus information that is to be written to the NFC tag 107 is selected. Here, as an example of displaying a menu, a remote UI access information button 907, an application start information button 908, and a pairing information button 909 are displayed, but the buttons are not limited to these, and a button for writing other information to the NFC tag 107 may be displayed.

After a menu for writing information to the NFC tag 107 is displayed in step S806 or step S810, the CPU 101 waits until a user operates a button (907 to 909) shown in FIG. 9C or 9D and the information that is to be written to the NFC tag 107 is changed. In the case where the information that is to be written to the NFC tag 107 is not changed (No in step S811), this processing flow ends.

On the other hand, in the case where the information that is to be written to the NFC tag 107 is to be changed (Yes in step S811), the processing moves to step S812. Here, in the case where the information that is to be written is information that requires a high degree of security, such as pairing information, the CPU 101 determines that it is necessary to change the interrupt setting for the NFC tag 107. It should be noted that if the CPU 101 determines that it is necessary to change the interrupt setting for a predetermined type of information, such as information that requires a high degree of security, this information is assumed to be stored with the type and the like thereof defined in advance. In the case where the interrupt setting for the NFC tag 107 needs to be changed (Yes in step S812), the processing moves to interrupt setting change/tag information change processing (step S813). The interrupt setting change/tag information change processing of step S813 will be described in detail using FIG. 10. After the processing, the CPU 101 ends this processing flow. On the other hand, in the case where it is not necessary to change the interrupt setting for the NFC tag 107 (No in step S812), in step S811, the CPU 101 writes information selected by a user to the storage region 402 of the NFC tag 107. Thereafter, this processing flow ends.

Interrupt Setting Change/Tag Information Change Processing

Figure 10:
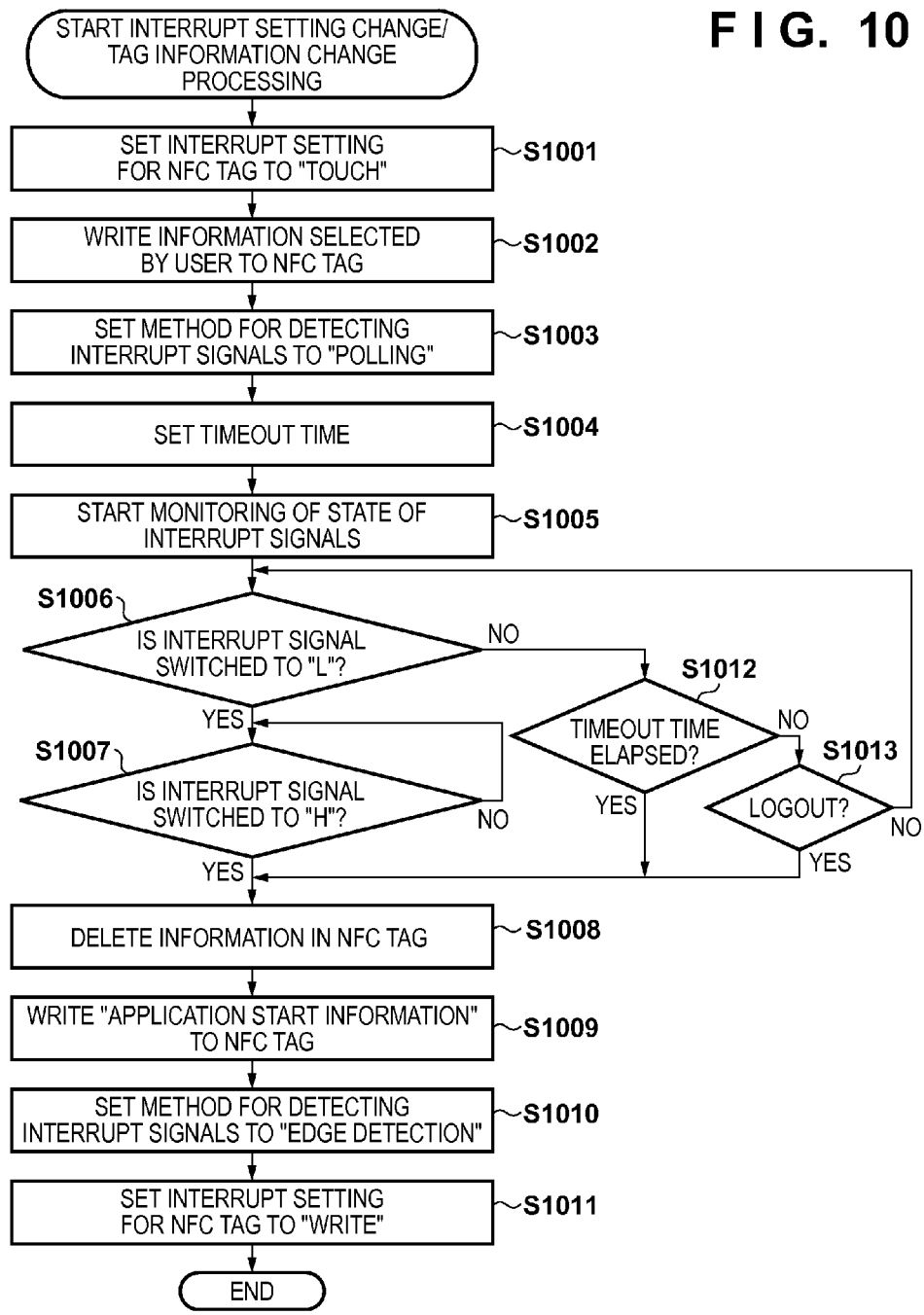
FIG. 10 is a flowchart indicating processing in which pairing information is written according to the first embodiment.

FIG. 10 is a diagram showing the flow of interrupt setting change/tag information change processing when pairing information is to be written to the NFC tag 107 in step S813 of FIG. 8.

In step S1001, the CPU 101 sets the interrupt setting for the NFC tag 107 to "touch". In step S1002, the CPU 101 writes "pairing information" selected by a user to the storage region 402 of the NFC tag 107. In step S1003, the CPU 101 switches the method for detecting interrupt signals generated by the NFC tag 107 to "polling". In the case where the method for detecting interruption is set to polling, the CPU 101 monitors interrupt signals generated by the NFC tag 107 at a predetermined time interval.

In step S1004, the CPU 101 sets a timeout time. Here, the timeout time refers to a set time for deleting information written to the storage region 402 in the case where the written information is not read by the reader/writer 307 within a predetermined time after the "pairing information" is written to the NFC tag 107. The timeout time can be set to an arbitrary value, and is stored in the ROM 103 as a setting value. In step S1005, the CPU 101 starts monitoring interrupt signals generated by the NFC tag 107. In step S1006, the CPU 101 monitors whether an interrupt signal of the NFC tag 107 changes to "L" level when the reader/writer 307 moves close to the NFC tag 107.

In the case where the CPU 101 cannot detect that the interrupt signal has changed to the "L" level (No in step S1006), the CPU 101 determines in step S1012 whether or not the time that has elapsed since starting the monitoring of interrupt signals is less than the timeout time. In the case where the time that has elapsed since starting the monitoring of interrupt signals is greater than or equal to the timeout time (Yes in step S1012), the processing moves to step S1008. Here, in the case where the time that has elapsed since starting the monitoring of interrupt signals is less than the timeout time (No in step S1012), the processing moves to step S1013. In the case where a user operates a logout button (not shown) displayed on the operation unit 120 (Yes in step S1013), the processing similarly moves to step S1008. In the case where the logout button (not shown) is not operated (No in step S1013), the processing returns to step S1006, and the CPU 101 restarts monitoring interrupt signals. When the NFC reader/writer 307 moves close to the NFC tag 107 and communication is started, the interrupt signal changes to the "L" level.

In the case of detecting that the interrupt signal has changed to the "L" level (Yes in step S1006), in step S1007, the CPU 101 starts monitoring whether the interrupt signal changes from the "L" level to "H" level in order to detect the completion of communication between the NFC tag 107 and the NFC reader/writer 307. The CPU 101 continues the monitoring until the interrupt signal changes to the "H" level. In the case of detecting that the interrupt signal has changed to the "H" level (Yes in step S1007), the CPU 101 determines that communication between the NFC tag 107 and the NFC reader/writer 307 is complete, and the processing moves to step S1008.

In step S1008, the CPU 101 deletes the "pairing information" written to the storage region 402 of the NFC tag 107. In step S1009, the CPU 101 writes "application start information", which serves as initial settings, to the storage region 402 of the NFC tag 107. This is information that is the same as the information written in step S801. In step S1010, the CPU 101 sets the method for detecting interrupt signals generated by the NFC tag 107 to "Edge detection". This is information that is the same as the information to be set in step S803. In step S1011, the CPU 101 then sets the interrupt setting for the NFC tag 107 to "write". This is information that is the same as the information set in step S802. Thereafter, this processing ends.

In the present embodiment, operations are described in which "pairing information" is deleted due to the NFC tag 107 generating interrupt signals after the NFC tag 107 is read by the NFC reader/writer 307. Alternatively, the information that is to be deleted is not limited to "pairing information", and may be other information as long as a user desires that it is deleted after it is read by the reader/writer 307.

Also, in the present embodiment, in the case where the "pairing information" is written to the storage region 402 of the NFC tag 107, the interrupt setting "touch" was set, in which interrupt signals are generated both when writing to and when reading from the NFC tag 107 (step S1001). Also, in the case where other information is written to the NFC tag 107 (in the case of No in step S812), the interrupt setting "write" was set, in which interrupt signals are generated only when the information is written to the storage region 402 of the NFC tag 107. This is because it is not necessary for the CPU 101 to detect that the NFC tag 107 was read in the present embodiment.

For example, in the case where the "application start information" is written to the storage region 402 of the NFC tag 107, the image forming apparatus 100 detects that the "application start information" was read by the reader/writer 307 but does not need to operate. Therefore, as a result of interrupt signals being generated by the NFC tag 107, the CPU 101 is not caused to execute unnecessary interrupt processing. However, in the case where the image forming apparatus 100 executes operations when the information that has been written to the storage region 402 of the NFC tag 107 is read by the reader/writer 307, the NFC tag 107 may generate interrupt signals. Thus, the interrupt setting may be performed for the NFC tag 107 so that interrupt signals are always generated when non-contact communication is performed with the reader/writer 307.

Also, although the present embodiment described that the NFC tag 107 of the image forming apparatus 100 is assumed to be an NFC tag dedicated IC, the NFC tag 107 may be an NFC reader/writer IC that operates in a card emulation mode.

Also, although a description has been given using the operations of the NFC tag 107 and the NFC reader/writer 307 in the present embodiment, the present invention is not limited to this, and a non-contact wireless communication device in which the interrupt setting can be changed in a manner similar to that of the present embodiment may be used.

According to the first embodiment as described above, the image forming apparatus 100 can determine that information in the NFC tag 107 has been read, and improve the security by deleting information in the NFC tag 107 immediately after the information has been read. Also, it is possible to reduce the interruption load of the image forming apparatus 100 to the CPU 101.

Second Embodiment

A second embodiment according to the present invention will be described. The first embodiment described an example in which the image forming apparatus 100 operates in a normal state (a non-power-saving state). In this case, it is conceivable that if interrupt signals are generated both when the NFC reader/writer 307 writes to the NFC tag 107 and when the NFC reader/writer 307 reads from the NFC tag 107, the CPU 101 is caused to perform unnecessary interrupt processing. Thus, in the first embodiment, the initial state of the interrupt setting for the NFC tag 107 is set to "write" (step S802 in FIG. 8).

In the case where the image forming apparatus 100 operates in a sleep mode (a power operation mode in a power saving state), the CPU 101 operates in the power saving state, and realizes the power saving state by stopping functions other than the interrupt signal detection unit (not shown). Therefore, the image forming apparatus 100 needs to return to a normal state (a normal power operation mode) from the sleep mode by receiving the interrupt signals so that the CPU 101 executes the processing.

Also, in the case where the information that has been written to the storage region 402 of the NFC tag 107 is read by the NFC reader/writer 307 of the mobile terminal 300, it is conceivable that the image forming apparatus 100 receives a processing execution command from the mobile terminal 300. For example, in the case where the "application start information" is written to the storage region 402 of the NFC tag 107, an application that causes the image forming apparatus 100 to execute various processes is started in the mobile terminal 300 that has read the information. In the case where image data is transmitted to/printed by the image forming apparatus 100 from the mobile terminal 300 via this application, it is necessary for the CPU 101 to operate in a normal state so that the image forming apparatus 100 executes a printing job. Thus, in the case where communication is performed with the image forming apparatus 100 and the NFC tag 107 using the NFC reader/writer 307, it is desirable that the NFC tag 107 generates interrupt signals so that the CPU 101 returns to the normal state from the power saving state.

Processing Flow

Processing in which the image forming apparatus 100 transitions to a sleep mode and processing in which the image forming apparatus 100 returns to the normal state from the sleep mode will be described with reference to FIG. 11. For example, in the case where a user operates a sleep transition button (not shown) of the operation unit 120, or in the case where the operation unit 120 is not operated for a predetermined time, in step S1101, the image forming apparatus 100 executes processing for transitioning to the sleep mode. The sleep mode transition processing is the processing in which for example, the power of an LCD included in the operation unit 120, and blocks such as a scanner unit 130 and the printer unit 140 that are not used in the sleep mode are turned off.

In step S1102, the CPU 101 sets the interrupt setting for the NFC tag 107 to "touch". In step S1103, the CPU 101 starts monitoring interrupt signals generated by the NFC tag 107. At this time, the CPU 101 continues monitoring whether the interrupt signal of the NFC tag 107 changes to the "L" level when the reader/writer 307 moves close to the NFC tag 107.

In the case where the interrupt signals of the NFC tag 107 change to the "L" level (Yes in step S1103), the processing moves to step S1105. Also, in the case where a return from the sleep mode is caused by a cause other than the interrupt signal of the NFC tag 107 changing to the "L" level (Yes in step S1104), the processing moves to step S1105. A return from the sleep mode is caused by a user operating the operation unit 120 or by a print job being transmitted from the PC 200 or the mobile terminal 300 to the image forming apparatus 100. It should be noted that the cause of the return from the sleep mode is not limited to this, and may be another cause. In the case where no return from the sleep mode is caused (No in step S1104), the processing returns to step S1103, and the CPU 101 continues the monitoring of the interrupt signals of the NFC tag 107.

In step S1105, the CPU 101 transitions to processing for returning from the sleep mode to the normal mode. Normal mode return processing is the processing in which in contrast with the sleep mode transition processing, the power of the LCD included in the operation unit 120, and the blocks such as the scanner unit 130 and the printer unit 140 are turned on. When the normal mode change processing ends, in step S1106, the CPU 101 sets the interrupt setting for the NFC tag 107 to "write". Thereafter, this processing flow ends.

As described above, in the second embodiment, the interrupt setting for the NFC tag 107 is set to "write" when the image forming apparatus 100 transitions to the sleep mode. Accordingly, it is possible to perform the normal mode return processing immediately when the NFC tag 107 moves close to the NFC reader/writer 307 in the sleep mode.

Third Embodiment

A third embodiment according to the present invention will be described. Although the first embodiment was described on the premise that one type of information is written to the NFC tag 107, a plurality of pieces of information may be written to the NFC tag 107. Detailed description will be given using FIGS. 12A, 12B, and 13.

FIGS. 12A and 12B are diagrams showing that a plurality of pieces of information are written to the storage region 402 of the NFC tag 107. In FIG. 12A, information whose interrupt setting for the NFC tag 107 is "write" is written to the memory blocks included in the storage region 402. Here, the case where the "pairing information" is written in step S807 of FIG. 8 will be described as an example. For example, in the case where the "pairing information" is written to a memory block 0 of the storage region 402 of the NFC tag 107, the memory block of the storage region 402 is in the state shown in FIG. 12B. In other words, the interrupt setting for the "pairing information" is set to "touch".

Processing Flow

Figure 13:
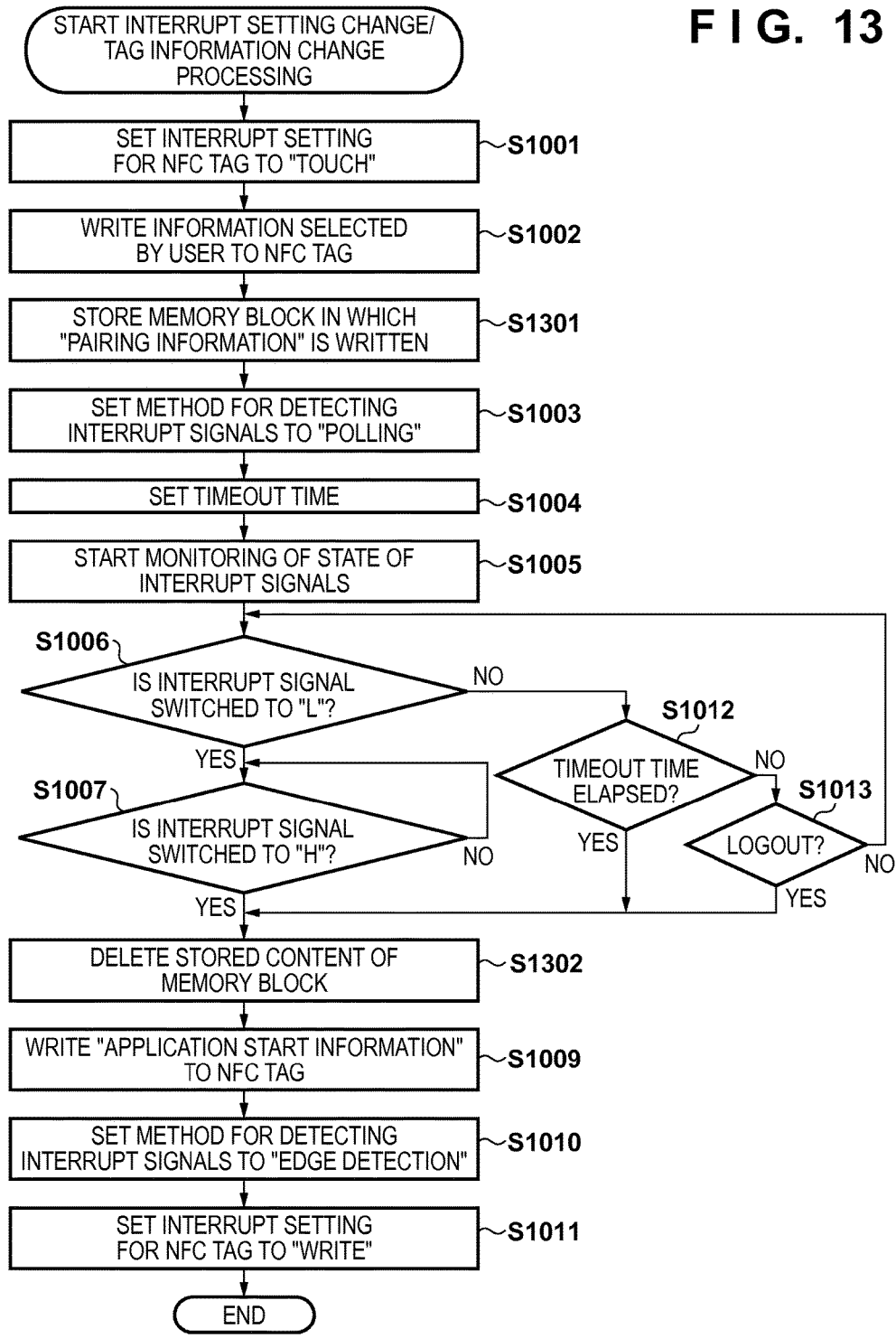
FIG. 13 is a flowchart indicating processing in which pairing information is written in a third embodiment.

FIG. 13 is a diagram illustrating a processing flow in the third embodiment. This processing is the processing that corresponds to FIG. 10 (step S813 of FIG. 8) in the first embodiment. In the case where a user desires that information (here, "pairing information") is deleted after being read by the NFC reader/writer 307, that information is written to a specific block of the NFC tag 107, and the processing transitions to the processing flow of FIG. 13. The processes of steps S1301 and S1302 in FIG. 13 are different from FIG. 10 of the first embodiment. Because other processes are similar to FIG. 10 described in the first embodiment, description thereof is omitted here.

In the case where the "pairing information" has been written to the storage region 402 of the NFC tag 107 in step S1002, in step S1301, the CPU 101 temporarily stores information in the memory block of the storage region 402 to which the "pairing information" has been written in the RAM 102. Subsequently, the CPU 101 executes the processes of steps S1003 to S1007. After non-contact communication between the NFC tag 107 and the NFC reader/writer 307 is complete, in step S1302, the CPU 101 deletes, from the information in the memory block that has been stored in the RAM 102, only the region of the memory block to which the "pairing information" has been written. The subsequent processing is similar to the processing flow illustrated in FIG. 10.

Here, although a description was given in which the memory block 0 of the storage region 402 of the NFC tag 107 serves as a target to which the "pairing information" is to be written, an arbitrary block can be selected, and the target is not limited to this and may be another block.

As described above, according to the third embodiment, even in the case where different information is written to a plurality of memory blocks of the storage region 402 of the NFC tag 107 that is included in the image forming apparatus 100, it is possible to delete only the information in a block that is desired to be deleted after the information has been read.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060797, filed Mar. 24, 2014, which is hereby incorporated by reference herein in its entirety.

What is claimed is:

1. An information processing apparatus comprising:
an NFC (Near Field Communication) tag;
a memory that stores programs; and
a processor;
wherein the processor executes the programs:
to write information to the NFC tag;
to set, when writing first information to the NFC tag, to the NFC tag, a first interrupt setting that is for generating an interrupt signal in a case where an external apparatus moves close to the NFC tag, and set, when writing second information different from the first information to the NFC tag, to the NFC tag, a second interrupt setting different from the first interrupt setting,
to detect, based on an interrupt signal corresponding to the first interrupt setting, that the first information written to the NFC tag has been read by an external apparatus, and
to delete, when detecting that the first interrupt information has been read by the external apparatus, the first information written to the NFC tag.

2. The information processing apparatus according to claim 1,
wherein the first information is pairing information including at least an SSID (Service Set Identifier) and an IP (Internet Protocol) address of the information processing apparatus.

3. The information processing apparatus according to claim 1,
wherein the first information is pairing information including at least an IP (Internet Protocol) address of the information processing apparatus.

4. The information processing apparatus according to claim 1,
wherein the second interrupt setting is a setting which is for generating an interrupt signal when information is written to the NFC by an external apparatus.

5. The information processing apparatus according to claim 1,
wherein the processor further executes, based on the programs:
to change a setting from the first interrupt setting to the second interrupt setting when detecting that the first information has been read by the external apparatus.

6. The information processing apparatus according to claim 1,
wherein the processor further executes, based on the programs:
to write the second information to the NFC tag when the information processing apparatus starts, and
to write the first information to the NFC tag in accordance with receiving a write instruction from a user.

7. The information processing apparatus according to claim 1,
wherein the processor further executes, based on the programs:
to write the second information to the NFC tag when the first information which has been written to the NFC is deleted.

8. The information processing apparatus according to claim 1,
wherein the second information is application start information for controlling an external apparatus to start a specific application.

9. The information processing apparatus according to claim 1,
wherein the information processing apparatus is a printing apparatus.

10. A method for controlling an information processing apparatus having an NFC (Near Field Communication) tag, the method comprising:
writing information to the NFC tag;
setting, when writing first information to the NFC tag, to the NFC tag, a first interrupt setting that is for generating an interrupt signal in a case where an external apparatus moves close to the NFC tag, and setting, when writing second information different from the first information, to the NFC tag, a second interrupt setting different from the first interrupt setting,
detecting, based on an interrupt signal corresponding to the first interrupt setting, that the first information written to the NFC tag has been read by an external apparatus, and
deleting, when detecting that the first interrupt information has been read by the external apparatus, the first information written to the NFC tag.

11. A non-transitory computer-readable medium that stores a program which, when executed by a computer having Near Field Communication (NFC) tag, causes the computer to perform a method comprising:
writing information to the NFC tag;
setting, when writing first information to the NFC tag, to the NFC tag, a first interrupt setting that is for generating an interrupt signal in a case where an external apparatus moves close to the NFC tag, and set, when writing second information different from the first information, to the NFC tag, a second interrupt setting different from the first interrupt setting,
detecting, based on an interrupt signal corresponding to the first interrupt setting, that the first information written to the NFC tag has been read by an external apparatus, and
deleting, when detecting that the first interrupt information has been read by the external apparatus, the first information written to the NFC tag.

* * * * *